United States Patent [19]

Böhnstedt et al.

[11] 4,104,449

[45] Aug. 1, 1978

[54] PRIMARY BATTERY OF THE REMOTELY ACTIVATED TYPE

[75] Inventors: Werner Böhnstedt, Rheinberg; Manfred Stommel, Duisburg, both of Fed. Rep. of Germany

[73] Assignee: Electrochem, Inc., New York, N.Y.

[21] Appl. No.: 735,367

[22] Filed: Oct. 26, 1976

[30] Foreign Application Priority Data

Nov. 8, 1975 [DE] Fed. Rep. of Germany ....... 2550304

[51] Int. Cl.$^2$ ............................................ H01M 6/30
[52] U.S. Cl. .................................. 429/110; 429/219; 429/229
[58] Field of Search .............. 429/110, 113, 118, 188, 429/203, 204, 219, 229, 199, 200, 225, 228

[56] References Cited

U.S. PATENT DOCUMENTS

| 2,472,379 | 6/1949 | Lawson | 429/203 X |
|---|---|---|---|
| 2,517,132 | 8/1950 | Piper et al. | 429/203 X |
| 2,929,860 | 3/1960 | McCallum et al. | 429/203 |
| 2,948,767 | 8/1960 | Johnson et al. | 429/110 |
| 3,196,049 | 7/1965 | Shilke | 429/113 |

Primary Examiner—Anthony Skapars
Attorney, Agent, or Firm—Donald E. Nist

[57] ABSTRACT

The present invention includes a primary battery of the remotely activated type which may include one or more zinc electrodes and which is filled with a liquid electrolyte only when the battery is to be activated. A novel feature of the invention is the use of an acid or mixture of acids in aqueous solution as the electrolyte. Hydrochloric acid, phosphoric acid and sulfuric acid are preferred, although other acid can also be used in various concentrations as the electrolyte. The voltage of the battery is unexpectedly higher and the battery has a faster activation time at low temperatures than if an alkaline electrolyte were used. A superior high voltage short duration battery is thus obtained.

9 Claims, No Drawings

PRIMARY BATTERY OF THE REMOTELY ACTIVATED TYPE

BACKGROUND OF THE INVENTION

1. Field of the Invention:

The present invention generally relates to batteries and more particularly to primary batteries of the remotely activated type which utilize one or more zinc electrodes.

2. Prior Art:

The usual types of primary batteries of the remotely activated type intended for single use and employing zinc and silver oxide electrodes normally are activated by adding alkaline electrolytes thereto. Such batteries exhibit inferior properties at temperatures of between about $-10°$ C and about $-50°$ C. For example, it is impossible to activate such a primary battery at a temperature of $-20°$ C to the rated voltage for the battery within a time of less than one second. It is believed that the reason for the long activation time is because that is the length of time at that temperature needed to dissolve the passivation coat on the zinc in the electrolyte and thus permit full activation of the battery. The passivation coat time increases as the cell temperature is decreased. Thus, such time increases from about one second at $-20°$ C to about 30 seconds at $-40°$ C when the zinc electrodes used in the battery have been manufactured by electrolytic deposition. There are many potential uses for such primary batteries which uses require activation times far less than those encountered with the existing primary batteries described above. For example, some potential applications require battery activation times not in excess of one second at $-40°$ C and not in excess of 250 milliseconds at $-20°$ C. These rapid activation times cannot be accomplished by existing primary batteries of the type described above except through the use of expensive auxiliary equipment and/or techniques.

Accordingly, it would be desirable to provide a primary battery of the remotely activated type which would exhibit an activation time at lower temperatures which would meet potential application requirements and which would be substantially less than comparable existing primary batteries of the same type. Such primary batteries exhibiting the reduced activation time should preferably be simple and inexpensive and not require the use of auxiliary equipment and/or techniques.

SUMMARY OF THE INVENTION

The improved primary battery of the present invention overcomes the foregoing problems and satisfies the foregoing needs. The battery is substantially as set forth in the Abstract above. Thus, it includes one or more zinc electrodes plus one or more other electrodes, such as silver oxide electrodes, activatable by the introduction of an electrolyte. In this instance, however, in contrast to conventional primary batteries of this type, the electrolyte is a selected acid or acids in aqueous solution rather than an alkaline electrolyte. Preferably, strong mineral inorganic acids such as sulfuric acid, hydrochloric acid or phosphoric acid are used. For example, a 12 normal solution of sulfuric acid in water reduces the activation time to less than 250 milliseconds at $-40°$ C and to less than 100 milliseconds at $-20°$ C. Moreover, surprisingly the voltage of the battery is higher than when an alkaline electrolyte is used. Selection of the proper acid is made on the basis of the rapidity with which it dissolves the passivation coat and its electrolytic conductivity and freezing point. Further features are set forth in the following detailed description.

DETAILED DESCRIPTION

The improved primary battery of the present invention includes one or more zinc electrodes. The zinc electrodes may be generated by any suitable means, such as manufacturing them by conventional electrolytic deposition. Preferrably the battery also includes one or more silver oxide electrodes or the like of any conventional form for use with zinc electrodes. The battery is one which can be remotely activated by the introduction thereinto of acid electrolyte immediately before use. Thus, the battery is designed to deliver a high voltage for a short period of time only in a single use or "one shot" operation.

The acid utilized as the electrolyte is any suitable acid which has a low freezing point, is highly electrically conductive at low temperatures of the order of about $0°$ C to about $-50°$ C and which dissolves the passivation layer on the zinc electrodes surface sufficiently rapidly so that upon introduction of the electrolyte to activate the battery, the battery in fact becomes fully activated very rapidly, for example in milliseconds at temperatures as low as $-40°$ C. For such purposes it is preferred to utilize strong mineral acids such as hydrochloric, sulfuric, phosphoric and mixtures thereof which are in suitable concentrations in aqueous solutions. For example, sulfuric acid is preferably used at a concentration of between about 5 and about 15 normal in water, most preferably about 12 normal. In the case of hydrochloric acid, it has been found that aqueous solution concentrations of about 5 normal are preferred, while in the case of phosphoric acid, aqueous solution concentrations of about 26 normal are preferred. Of the acids contemplated, sulfuric acid has the further advantage of a lesser chemical corrosive effect on zinc electrodes than other useful acids so that during a discharge of the battery only a relatively minor evolution of undesired hydrogen gas occurs.

In any event, the improved primary battery of the deferred activated type corresponding to the present invention is intended for only a short activation life of less than 10 minutes so that the chemical dissolving of the zinc caused by the action of the acid electrolyte and which is accompanied by the development of hydrogen gas is transitory and causes no material problems in the operation of the battery.

As a specific example, a primary battery of the deferred activated type of the present invention employing a zinc electrode fabricated by electrolytic deposition and also employing a silver oxide electrode, is activated by introduction (from a remotely controlled source) of a 12 normal aqueous solution of sulfuric acid. The battery exhibits an activation time to reach maximum voltage of less than 250 milliseconds at $-40°$ C. In a parallel test, a comparable battery exhibits an activation time to reach full voltage of less than 100 milliseconds at $-20°$ C. In each instance the voltage of the battery is higher than that obtainable utilizing the same electrodes but substituting an alkaline electrolyte. When the silver oxide electrodes are fully charged, the voltage obtainable from the freshly activated battery is initially two volts and then drops to about 1.65 volts. In any event, the voltage characteristics of the battery are substantially improved over the same battery employing a 7 normal solution of potassium hydroxide in place of the acid electrolyte. Accordingly, the primary battery of the present invention has improved voltage characteristics as well as reduced activation time at low temperatures, all without necessitating the use of auxilliary equipment and/or techniques.

Various modifications, changes, alterations and additions can be made in the present battery and in its components and their parameters. All such changes, modifications, alterations and additions as are within the scope of the appended claims form part of the present invention.

What is claimed is:

1. An improved primary battery comprising at least one zinc electrode and a silver oxide counter-electrode, said battery including acid in aqueous solution as a battery-activating electrolyte.

2. The improved primary battery of claim 1 wherein said battery is activatable to provide a relatively high voltage for a short time span after activation.

3. The improved primary battery of claim 2 wherein said acid includes sulfuric acid in a concentration sufficient to dissolve the passivation layer on said zinc electrode rapidly at temperatures below about 0° C.

4. The improved primary battery of claim 3 wherein said sulfuric acid is in a concentration of about 5 to about 15 normal.

5. The improved primary battery of claim 4 wherein said sulfuric acid concentration is about 12 normal.

6. The improved primary battery of claim 2 wherein said acid comprises hydrochloric acid.

7. The improved primary battery of claim 6 wherein said hydrochloric acid is in a concentration of about 5 normal.

8. The improved primary battery of claim 2 wherein said acid comprises phosphoric acid.

9. The improved primary battery of claim 8 wherein said phosphoric acid is in a concentration of about 26 normal.

* * * * *